US008670442B2

(12) United States Patent
Hans et al.

(10) Patent No.: US 8,670,442 B2
(45) Date of Patent: *Mar. 11, 2014

(54) METHOD FOR BIDIRECTIONAL DATA TRANSMISSION VIA A PACKET-ORIENTED NETWORK DEVICE

(75) Inventors: Martin Hans, Hildesheim (DE); Frank Kowalewski, Salzgitter (DE); Josef Laumen, Hildesheim (DE); Gunnar Schmidt, Wolfenbuettel (DE); Siegfried Baer, Pforzheim (DE); Mark Beckmann, Braunschweig (DE)

(73) Assignee: Ipcom GmbH & Co. KG, Pullach (DE)

( * ) Notice: Subject to any disclaimer, the term of this patent is extended or adjusted under 35 U.S.C. 154(b) by 467 days.

This patent is subject to a terminal disclaimer.

(21) Appl. No.: 12/561,900

(22) Filed: Sep. 17, 2009

(65) Prior Publication Data

US 2010/0008354 A1    Jan. 14, 2010

Related U.S. Application Data

(63) Continuation of application No. 10/181,577, filed as application No. PCT/DE01/00390 on Feb. 2, 2001, now Pat. No. 7,613,168.

(30) Foreign Application Priority Data

Feb. 16, 2000    (DE) .................................. 100 07 012

(51) Int. Cl.
*H04L 12/28*    (2006.01)
(52) U.S. Cl.
USPC .......................................... 370/352; 370/393
(58) Field of Classification Search
None
See application file for complete search history.

(56) References Cited

U.S. PATENT DOCUMENTS

| 5,331,634 A | 7/1994 | Fischer |
| 5,978,386 A | 11/1999 | Haemaelaeinen et al. |
| 6,366,961 B1 * | 4/2002 | Subbiah et al. ............... 709/238 |
| 6,396,828 B1 * | 5/2002 | Liu .............................. 370/352 |

(Continued)

FOREIGN PATENT DOCUMENTS

| DE | 102008011324 B3 | 4/2009 |
| EP | 1705057 A1 | 9/2006 |

(Continued)

OTHER PUBLICATIONS

"Interface Between Data Terminal Equuipment . . . " Malaga-Torremolinos, 1984, pp. 482-539 (In English).

(Continued)

*Primary Examiner* — Minh-Trang Nguyen
(74) *Attorney, Agent, or Firm* — Nelson Mullins Riley & Scarborough LLP

(57) ABSTRACT

A telecommunication system for bidirectional data transmission of a data set between a data transmission device and a data reception device via at least one packet-oriented network device, which includes encapsulation of the data set to enable a connection-oriented data transmission of the data set; connection-oriented transmission of the encapsulated data set by means of at least one mobile telephone from the data transmission device to a base station of a mobile telephone network; evaluation of the data encapsulation protocol in the base station for an unpacking of the data set to enable a packet-oriented data transmission of the data set; and packet-oriented transmission of the data set from the base station to the data reception device.

4 Claims, 3 Drawing Sheets

(56) References Cited

U.S. PATENT DOCUMENTS

| | | | | |
|---|---|---|---|---|
| 6,400,722 | B1* | 6/2002 | Chuah et al. | 370/401 |
| 6,404,754 | B1* | 6/2002 | Lim | 370/338 |
| 6,424,639 | B1* | 7/2002 | Lioy et al. | 370/338 |
| 6,434,140 | B1* | 8/2002 | Barany et al. | 370/466 |
| 6,850,540 | B1* | 2/2005 | Peisa et al. | 370/468 |

FOREIGN PATENT DOCUMENTS

| | | |
|---|---|---|
| GB | 2194729 | 3/1988 |
| WO | 96/21984 | 7/1996 |
| WO | 97/48211 A2 | 12/1997 |
| WO | 98/43446 | 10/1998 |
| WO | 98/47256 | 10/1998 |
| WO | 98 47256 A | 10/1998 |
| WO | 99/43133 | 8/1999 |
| WO | 99 43133 A | 8/1999 |
| WO | 99/56445 | 11/1999 |
| WO | 99 56445 A | 11/1999 |
| WO | 99/62223 | 12/1999 |
| WO | 99/65178 | 12/1999 |

OTHER PUBLICATIONS

"The GSM System for Mobile Communications" by Michel Mouly et al, 1992, pp. 146-147, 166-170, 112. (In English).

GSM 02.34 V8.1.0, Digital Cellular Telecommunication System . . . , Jul. 1999 (In English).

ETS TR 101 643 V7.0.0, Digital Celluar Telecommunications System . . . , Aug. 1999 (In English).

ETSI TS 100 975 V7.0.0, Digital Cellular Telecommunications System . . . , Aug. 1999 (In English).

Jari Haemaelaeinen et al:"Proposed Operation of . . . " IEEE 1995, pp. 372-377 (In English).

ETSI TS 100 915 V7.0.0, Digital Communications System . . . , Aug. 1999 (In English).

3G TS 23.010, V3.0.0 3-RD Generation Partnership Project . . . , May 1999 (In English).

Reiner Ludwig et al: "Link Layer Enhancement . . . " IEEE 1999, pp. 415-422 (In English).

Haemaelaeinen J., et al: "Proposed Operation of GSM Packet Radio Netswork", IEEE International Symposium on Personal, Indoor and Mobile Radio Communications, BD. 1, Sep. 27, 1995, pp. 273-377.

"Interface between data terminal equipment (DTE) and data circuit-terminating equipment (DCE) for terminals operating in the packet mode and accessing a packet switched public data network through a public switched telephone network or an integrated services digital network or a circuit switched public data network," (Malaga-Torremolinos, 1984, amended at Melbourne, 1988) Fascicle VIII.2—Rec. X.32, pp. 482-539.

International Search Report for Application No. PCT/DE2010/000390, 2 pages, dated Jul. 1, 2010.

3G TS 23.060 Draft V3.2.0, "3rd Generation Partnership Project; Technical Specification Group Services and System Aspects; Digital cellular telecommunications system (Phase 2+); General Packet Radio Service (GPRS); Service description; Stage 2," (1999).

3G TS 23.107 V3.1.0, "3rd Generation Partnership Project; Technical Specification Group Services and System Aspects; QoS Concept and Architecture," (1999).

3G TS 23.910 V1.0.0, "3rd Generation Partnership Project; Technical Specification Group Core Network; Circuit Switched Data Bearer Services," (1999).

3G TS 25.310 V3.3.0, "3rd Generation Partnership Project; Technical Specification Group Radio Access Network; Radio Interface Protocol Architecture," (1999).

3G TS 25.410 V3.1.0, "3rd Generation Partnership Project; Technical Specification Group Radio Access Network; UTRAN lu Interface: General Aspects andn Principles," (2000).

3G TS 25.414 V3.2.0, "3rd Generation Partnership Project; Technical Specification Group Radio Access Network; UTRAN lu Interface Data Transport and Transport Signalling," (2000).

Boldt, Marco et al., "Modeling an ATM-Based Access Network for 3rd Generation Mobile Communication Networks," 48th IEEE Vehicular Technology Conference, vol. 3:2590-2593 (1998).

Gruber, John G., "Delay Related Issues in Integrated Voice and Data Transmission: A Review and Some Experimental Work," SIGCOMM '79 Proceedings of the Sixth Symposium on Data Communications, pp. 166-180 (1979).

ITU: International Telecommunication Union, "Series X: Data Communication Networks: Services and Facilities, Interfaces," Reedition of CCITT Recommendation X.32 published in the Blue Book, Fascicle VIII.2 (1988).

* cited by examiner

METHOD FOR BIDIRECTIONAL DATA TRANSMISSION VIA A PACKET-ORIENTED NETWORK DEVICE

CROSS REFERENCE TO RELATED APPLICATIONS

The present application is a continuation application of co-pending U.S. patent application Ser. No. 10/181,577 now U.S. Pat. No. 7,613,168. The invention described and claimed herein is also described in PCT/DE 01/0039, filed on Feb. 2, 2001, and DE 100 07 012.4, filed Feb. 16, 2000. This German Patent Application, whose subject matter is incorporated here by reference, provides a basis for a claim of priority of invention under 35 U.S.C. 119 (a)-(d).

BACKGROUND OF THE INVENTION

The present invention relates to a telecommunications for bidirectional data transmission of a data set between a data transmission device and a data reception device via at least one packet-oriented network device.

Although applicable to arbitrary telecommunications devices, the present invention and the problems fundamental to it will be described here with reference to a radio connection in mobile radio networks.

Fundamentally, there are two different types of data transmission. One is connection-switched or -oriented transmission, and the other is packet-switched or -oriented data transmission.

In connection-oriented data transmission, a permanent connection exists between the data transmission device, in particular a modem or a mobile phone, and the data reception device, and the data transfer takes place via this permanent connection. This connection is made at the beginning, for instance via a mobile radio network, and is terminated again after the data transmission has been accomplished.

In packet-oriented data transmission, the data transmission device and the data reception device are not connected directly to one another via merely a connection but rather via at least one network, which is used by a plurality of data transmission devices and data reception devices. The data to be exchanged are combined into packets for a data transmission and directed via appended address information from the data transmission device to the data reception device. Data packets from different data transmission devices and data reception devices can thus be transmitted via an identical transmission medium. Only so-called logical connections exist in this case.

The advantage of the aforementioned connection-oriented data transmission is that a guaranteed data transmission capacity is available to a corresponding user or device at any time.

The advantages of the packet-oriented data transmission, also mentioned above, are improved data transmission efficiency between the amount of data and the data transmission capacity; that is, if the data transmission capacity is not exhausted by one logical connection, then the remaining capacity can be used by other logical connections as well.

Thus voice transmission services are typically made available virtually exclusively with the aid of connection-oriented data transmission, while services in the field of information technology, such as computer linking or internet access, utilize packet-oriented data transmission.

The networks known as the Public Switched Telephone Network (PSTN), the Integrated Services Digital Network (ISDN) and the Global System for Mobile Communication (GSM) offer connection-oriented services, for instance for voice transmission, fax transmission, and so forth.

Conversely, a local area network (LAN) and wide area network (WAN) offer packet-oriented services. These include the network known as General Packet Radio Service (GPRS) as a supplement to the Global System for Mobile Communication (GSM); the GPRS makes packet-oriented services possible from the service provider, for instance from the internet, to a mobile terminal by way of the network operator and a radio connection, for instance.

The problems fundamental to the present invention are above all in creating a possibility for direct use of packet-oriented networks by the user even if one part is switched in connection-oriented fashion.

At present, the following initial attempt exists in the prior art for solving this problem.

Via connection-oriented services, typically various selection choices are available, such as a modem connection via the PSTN, which offers access to the internet, for instance via a personal computer or laptop, via an internet service provider (ISP), for instance. For the personal computer or laptop, in comparison to direct packet-oriented network connection, there is no difference, since the data transmission packets can be transmitted "encapsulated", that is packed by means of a data protocol, via the connection-oriented network. Known protocols for this "encapsulation" of the data transmission packets are for instance the point-to-point protocol (PPP) or serial line internet protocol (SLIP). These protocols are allocated by the user to the data packets to be transmitted and are taken from a selection node, for instance at the internet service provider.

In the above attempt, the fact that the network operators that offer both packet-oriented and connection-oriented services must make both nonuniform addressing mechanisms and inefficient data transmission available, since they must transmit packet data in connection-oriented fashion, for instance to the internet service provider (ISP), even though packet-oriented switching may under some circumstances be present, has proved disadvantageous.

SUMMARY OF THE INVENTION

The telecommunications system of the invention has the advantage over the known attempt at attaining this object that in the internal network of the corresponding network device, the data to be transmitted are transmitted solely in packet-oriented fashion.

The concept on which the present invention is based is that the telecommunications system for bidirectional data transmission of a data set between a data transmission device and a data reception device via at least one packet-oriented network device, in which connection-oriented switching is done, contains the following steps:

allocation of a data encapsulation protocol to the data set to be transmitted connection-oriented in the data transmission device or an external data terminal device that is connected to the data transmission device, for an encapsulation of the data set to enable a connection-oriented data transmission of the data set;

connection-oriented transmission of the encapsulated data set by means of at least one telecommunications device from the data transmission device to the packet-oriented network device;

evaluation of the data encapsulation protocol in the packet-oriented network device for an unpacking of the data set to enable a packet-oriented data transmission of the data set; and packet-oriented transmission of the data set from the packet-oriented network device to the data reception device.

This offers network operators, as already mentioned above, the advantage of being able to transmit the data in the internal network solely by packet switching. Thus a uniform addressing mechanism is sufficient. Moreover, because of the packet-oriented data transmission, the data transmission efficiency is enhanced, because of better utilization of the data transmission capacity.

Moreover, the data packets to be transmitted are optimally switched or routed, if the network device operator and the internet service provider are identical.

Furthermore, purely packet-oriented data transmission via the network device makes various payment models possible. Thus in addition to the connection time, the amount of data, the number of data packets, payment depending on the type or use of the data packets, and so forth, a payment model with the continuous packet mode equivalent can be imagined.

In a preferred refinement, as a connection medium of the telecommunications device for a transmission of the data set from the data transmission device to the packet-oriented network device, a mobile radio network is used. Thus the data exchange, for instance between a mobile phone and an internet service provider, takes place via a radio network.

In a further preferred refinement, the evaluation of the data encapsulation protocol is performed in a radio network controller (RNC) device of the telecommunications device. This assures that at the very onset of the network device and continuously over the entire network device, a packet-oriented data transmission takes place. Thus only a data protocol adaptation can be performed by the operator of the network device.

In a further preferred refinement, the evaluation of the data encapsulation protocol is performed in a base station of the telecommunications device.

In a further preferred refinement, the telecommunications device supports both a connection-oriented and a packet-oriented data transmission. As a result, the network operator, for instance as a function of his radio path resources or capacity has the capability of transmitting the same service in either connection-oriented or packet-oriented fashion via an air interface.

For instance, in packet-oriented, real-time multimedia services, such as ITU-T H.323, in the case of high packet utilization via the air interface, it could be useful for such a service to shunt or switch dynamically over to the packet mode via a connection-oriented air interface.

In a further preferred refinement, the data transmission device supports both a connection-oriented and a packet-oriented data transmission.

Data terminal devices, in particular a modem or a mobile phone, that support a packet-oriented data transmission are more expensive, because of their more-complicated structure. Thus terminal devices lacking an air interface that is capable of handling packets, such as low-end or low-cost terminals, can have the same performance characteristics as data terminal devices with an air interface that is capable of handling packets. From the standpoint of use, there is no difference here from the continuous packet service. However, if, as described above, a switchover must be made between the two types of transmission, then the data terminal devices must support both a connection-oriented and a packet-oriented data transmission.

In a further preferred refinement, the external data terminal device is embodied in particular as a personal computer or laptop.

BRIEF DESCRIPTION OF THE DRAWINGS

Exemplary embodiments of the invention are shown in the drawings and described in further detail in the ensuing description.

Shown are.

DETAILED DESCRIPTION OF THE PREFERRED EMBODIMENTS

Figure 1:
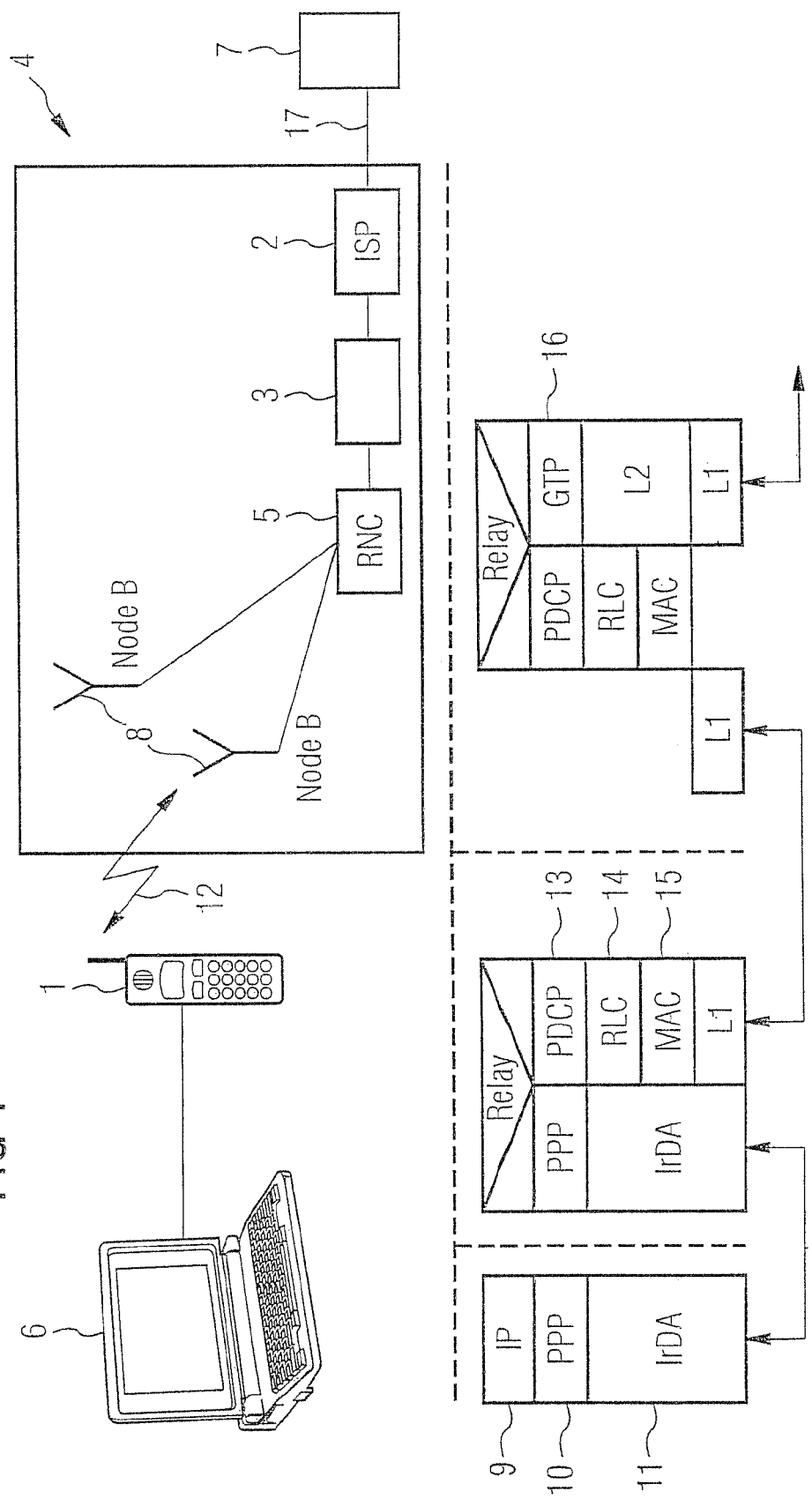
FIG. 1, a block circuit diagram of a network architecture and a protocol structure for a continuous packet mode in accordance with the prior art.

In the drawings, the same reference numerals represent identical or functionally identical components.

Figure 2:
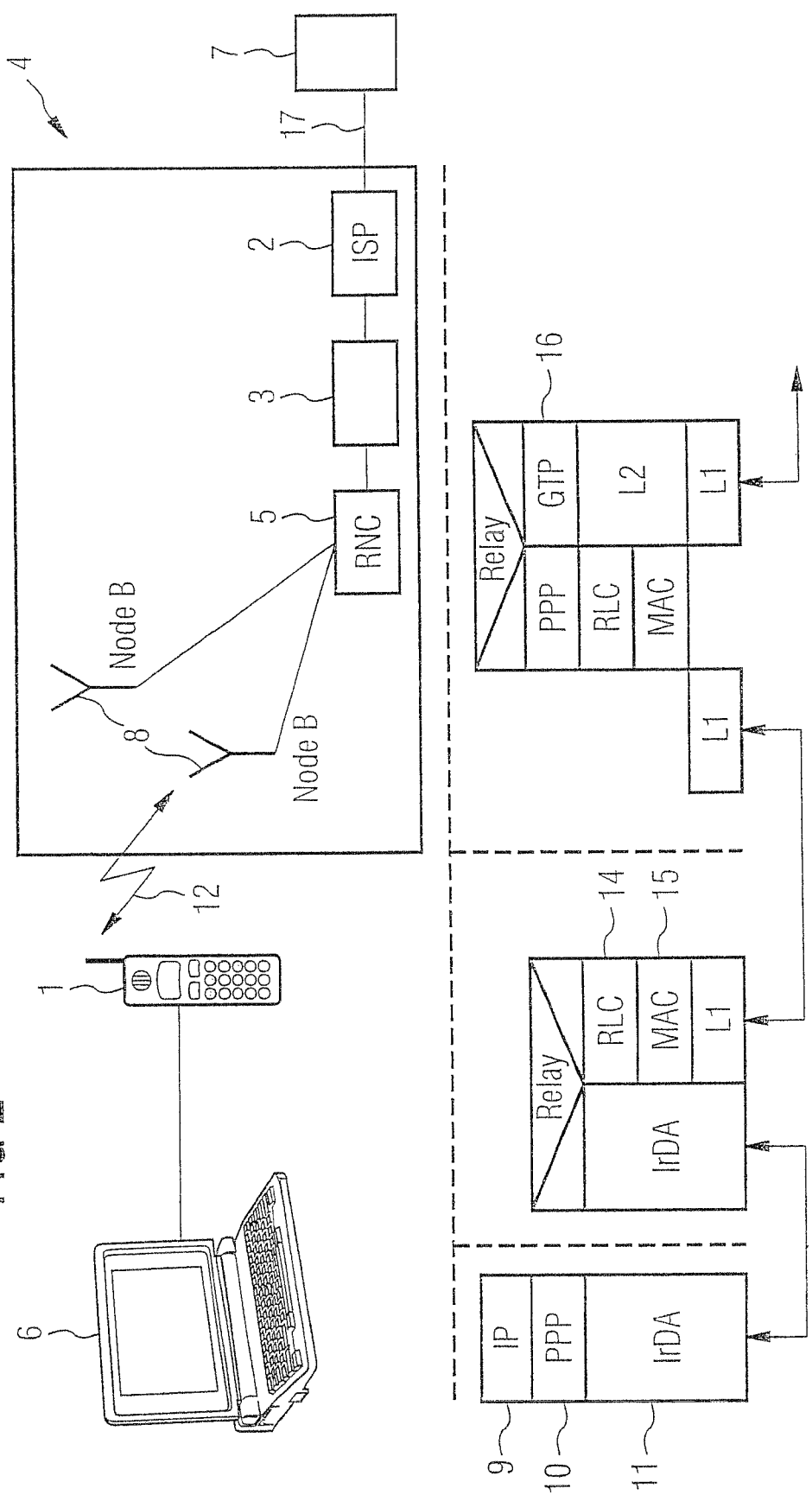
FIG. 2, a block circuit diagram of a network architecture and a protocol structure for a continuous packet mode via a connection-oriented air interface, in one embodiment of the present invention.

FIG. 2 is a block circuit diagram of the components involved in bidirectional data transmission in one exemplary embodiment of the present invention, along with the relevant protocol elements.

In this exemplary embodiment, the data to be transmitted are packed in a laptop 6, or alternatively a personal computer, by means of an internet protocol (IP) 9 and a point-to-point protocol (PPP) 10; the IP protocol 9 is responsible for wireless transporting of the data from the personal computer 6 via at least one network to a data reception device 7, or in the present case via an internet service provider 2 over the internet. The IP protocol 9 is disposed in layer 3 of the OSI reference model.

The PPP protocol 10 is located on layer 2 of the OSI protocol and serves to provide serial data transfer via selective connections. The PPP protocol 10 in a certain sense packs the data set to be transmitted for an encapsulation thereof, so as to enable data transmission via connection-oriented switching. In packet-oriented data transmission, such packing of the data set by means of the PPP protocol 10 is unnecessary. The data encapsulation protocol 10 is allocated in the laptop 6 to the data set to be transmitted in connection-oriented fashion.

The laptop 6 can be connected via a serial infrared interface (IrDA) 11 to a mobile terminal 1, in the present example a mobile phone 1. Via this infrared interface 11, the encapsulate or packed data set is transmitted from the laptop 6 to the mobile phone 1.

The packed data set passes through further protocol structures in the mobile phone 1, such as the radio link control protocol (RLC protocol) 14, which controls the logical channels, and the media access control protocol (MAC protocol) 15, which represents a sublayer of layer 2 of the OSI reference model and regulates access to a transmission medium by various strategies. The encapsulated data set is now transmitted from the mobile phone 1 via an air interface 12 or mobile radio network in connection-oriented fashion to a base station 8 (node B) of the telecommunications service 4. A permanent connection, over which the data transfer takes place, exists between the mobile phone 1 and the base station 8, or the network device 3 connected to the base station 8. Thus a certain data transmission capacity is assured at all times.

To make a uniform addressing mechanism possible, the data should not be switched as packed data in connection-oriented fashion and as unpacked data in packet-oriented fashion over the network 3 as two different transmission modes to an internet service provider (ISP) 2. Accordingly, up to the radio network controller (RNC) 5, a purely connection-oriented data transmission connection exists, as in the classical voice services. In the present exemplary embodiment of the present invention, all the data are transmitted via the network device 3 in packet-oriented fashion, as in the packet mode. For this purpose, the data encapsulation protocol 10, that is, the PPP protocol 10, is already evaluated or terminated in the radio network controller 5 or selectively in the base station 8 for an unpacking of the packed data set.

The conversion from the connection- to the packet-oriented data transmission is made in the radio network controller 5 at the transition to the GPRS tunneling protocol (GTP) 16; GPRS stands for General Packet Radio Service. Thus all the data can be transmitted purely in packet-oriented fashion over the entire network device 3. In comparison to conventional packet-oriented data transmission, as shown in FIG. 1, the evaluation of the PPP protocol 10 replaces the packet data convergency protocol (PDCP) 13 in the radio network controller 5, which is necessary for the continuous packet mode.

After that, the unpacked data set is transmitted in packet-oriented fashion from the packet-oriented network device 3 to a target receiver 7 by means of an internet service provider (ISP) 2 for a packet network, such as the internet.

Figure 3:
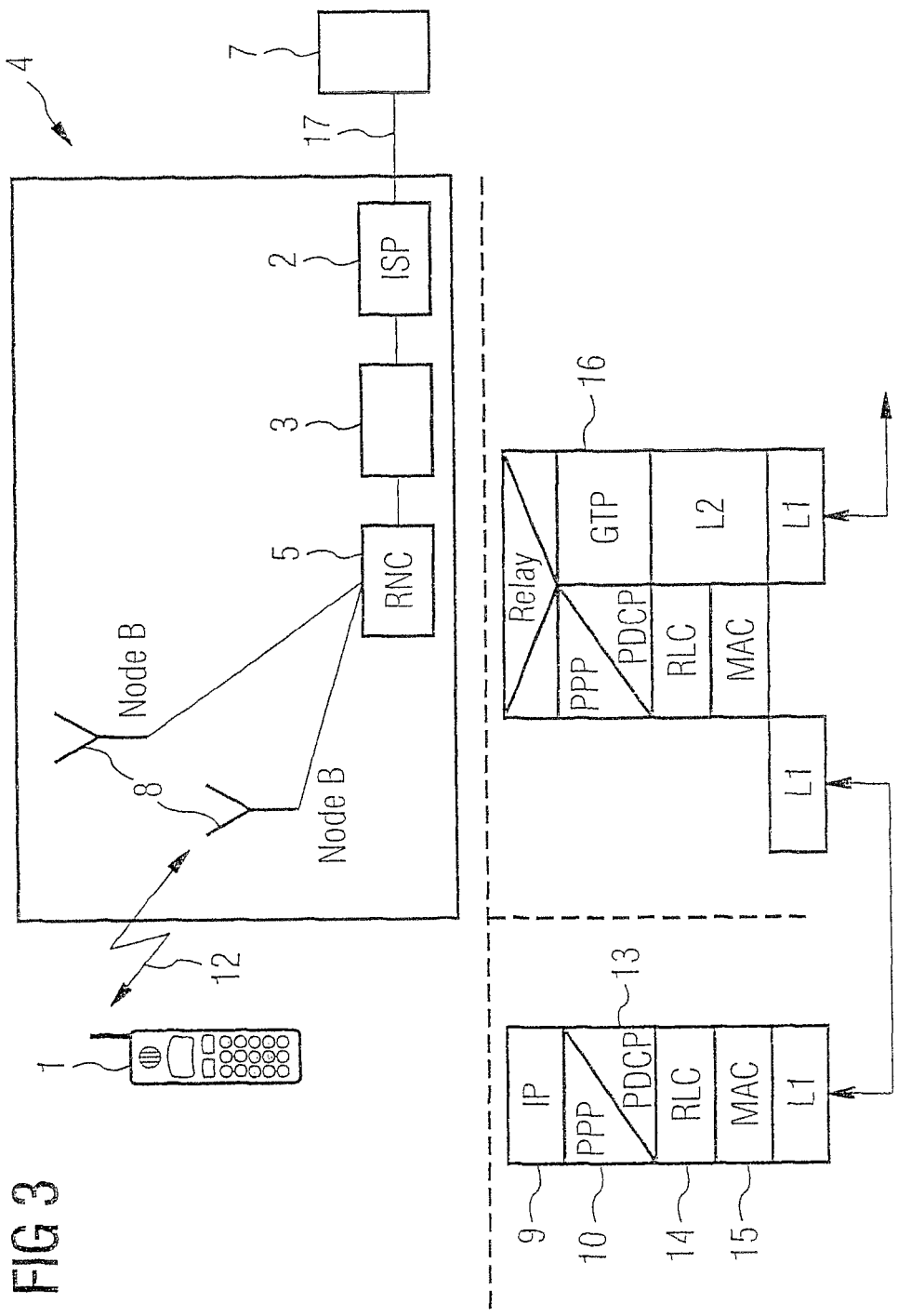
FIG. 3, a block circuit diagram of a network architecture and a protocol structure for a continuous combined packet mode via a connection-oriented or continuously packet-oriented air interface, in one embodiment of the present invention.

FIG. 3 shows a block circuit diagram of the components involved in the data transmission as well as the applicable protocol structure for a combined packet mode; transmission can be done selectively in connection- or continuously packet-oriented fashion via the air interface 12. The individual components here, like the corresponding protocol elements, have the functions already mentioned above.

Unlike the exemplary embodiment described above, here the internet protocol is embodied directly in the mobile phone 1. Thus initiating the PPP protocol does not require an external laptop or computer 6. The requisite PPP protocol element 10 is in fact an integral component of the multi-layer protocol stack in the mobile phone 1.

Moreover, in this exemplary embodiment the mobile phone 1 supports both continuous packet data transmission, as shown in FIG. 1 for the prior art, and the packet mode via the connection-oriented air interface 12.

This is shown clearly in FIG. 3 by the joint appearance of the protocol elements in the form of the point-to-point protocol (PPP) 10 and the packet data convergency protocol (PDCP) 13. This is because on the one hand, for a connection-oriented data transmission of the packed data set, an encapsulation of the data set to be transmitted by means of the PPP protocol 10 is required, and on the other, for a packet-oriented data transmission of a data set, the protocol element PDCP 13 is necessary.

For the user, there is no distinction between these two modes of transmission, but the network operator has the capability, depending on his radio path resources or his capacity, of offering or performing the same service in either connection- or packet-oriented fashion via the air interface 12. Thus in packet-oriented data transmission, for instance, in the case of high packet utilization or a high data quantity via the air interface 12, it can be useful to shunt to the packet mode via a connection-oriented air interface, or to switch over between these two modes. For that purpose, both a connection- and a packet-oriented data transmission must be supported by both the data transmission device 1 and the telecommunications device 4.

Although the present invention has been described above in terms of a preferred exemplary embodiment, it is not limited to this but instead can be modified in manifold ways.

In particular, instead of the protocol elements of the current type, described in these exemplary embodiments of the present invention, protocol elements with the same functions can also be used.

For example, the encapsulation protocol can also be realized in the form of a serial line internet protocol (SLIP), or the connection can be realized by means of a Bluetooth interface, or a Personal Computer Memory Card International Association (PCMCIA) connection.

The invention claimed is:

1. A telecommunications system for transmission of a data set from a data transmission device to a data reception device via at least one packet-oriented network device over which data is transmitted in a packet-oriented manner, said system comprising:
    a connection-oriented transmission mode for the transmission of the data set from supported connection-oriented transmission and packet-oriented transmission modes;
    a data encapsulation protocol adapted to be allocated to the data set to be transmitted for encapsulation of the data set to enable a connection-oriented transmission of the data set;
    an encapsulated data set for receipt following transmission over an air interface;
    a base station of a mobile phone network;
    wherein said base station is configured to evaluate the data encapsulation protocol of the encapsulated data set and unpack the encapsulated data set to produce an unpacked data set,
    said base station further configured for packet-oriented transmission of the unpacked data set to said at least one packet-oriented network device; and
    wherein said at least one packet-oriented network device is configured for packet-oriented transmission of the data set from the at least one packet-oriented network device via a packet network to the data reception device.

2. The telecommunications system according to claim 1, wherein the base station supports both a connection-oriented data transmission and a packet-oriented data transmission.

3. The telecommunications system according to claim 1, wherein the allocation of the data encapsulation protocol is made in a device connected to a mobile terminal.

4. The telecommunications system according to claim 1, wherein the allocation of the data encapsulation protocol is made in a mobile terminal.

* * * * *